(12) United States Patent
Utaki

(10) Patent No.: US 7,893,353 B2
(45) Date of Patent: Feb. 22, 2011

(54) CABLE PROTECTION AND GUIDE DEVICE

(75) Inventor: Akihiko Utaki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 366 days.

(21) Appl. No.: 12/202,318

(22) Filed: Aug. 31, 2008

(65) Prior Publication Data

US 2009/0084603 A1 Apr. 2, 2009

(30) Foreign Application Priority Data

Sep. 28, 2007 (JP) ............... 2007-254961

(51) Int. Cl.
*H02G 3/04* (2006.01)
(52) U.S. Cl. ............ 174/72 A; 174/68.1; 174/68.3; 174/19; 59/78.1; 59/900; 248/49
(58) Field of Classification Search ............. 174/19, 174/68.1, 68.3, 72 A; 59/78.1, 900; 248/49, 248/51; 138/110, 120, 108, 155
See application file for complete search history.

(56) References Cited

U.S. PATENT DOCUMENTS

| 6,984,782 | B2 * | 1/2006 | Ikeda et al. | 174/68.1 |
| 7,317,160 | B2 * | 1/2008 | Utaki | 174/19 |
| 7,406,819 | B2 * | 8/2008 | Utaki et al. | 59/78.1 |
| 7,418,812 | B2 * | 9/2008 | Ikeda et al. | 59/78.1 |
| 7,513,096 | B2 * | 4/2009 | Utaki et al. | 59/78.1 |
| 7,559,340 | B2 * | 7/2009 | Ikeda et al. | 248/49 |
| 7,637,092 | B2 * | 12/2009 | Utaki et al. | 59/78.1 |
| 7,640,722 | B2 * | 1/2010 | Utaki | 59/78.1 |
| 7,741,563 | B2 * | 6/2010 | Harada et al. | 174/68.1 |

FOREIGN PATENT DOCUMENTS

JP 4108736 B 6/2008

\* cited by examiner

*Primary Examiner*—Angel R Estrada
(74) *Attorney, Agent, or Firm*—Woodling, Krost and Rust

(57) ABSTRACT

A general purpose mounting bracket of a specific length which can be easily mounted onto a cable protection and guide device. The cable protection and guide device includes a fine setting of the entire length can be made without increasing the number of parts. A bracket joint includes a coupling portion (124) at one end of the bracket joint and a male connecting plate (127) or a female connecting plate (128) at the other end thereof. The mounting brackets positioned at a mounting fixed end and a mounting movable end engage the coupling portion (124) which exists at one end of the bracket joint, from a cable accommodating space side so as to be fitted to the coupling portion (124) by a snap-fit mechanism.

2 Claims, 18 Drawing Sheets

CABLE PROTECTION AND GUIDE DEVICE

This patent application claims priority to Japanese Patent Application Serial No. 2007-254961 filed Sep. 28, 2007.

TECHNICAL FIELD

The present invention relates to a cable protection and guide device, and more specifically it relates to a cable protection and guide device suitable for accommodating a cable or the like such as a cable (cables), a hose (hoses), which supplies a movable portion of an industrial machine with energy such as electric power or compressed air.

BACKGROUND TECHNOLOGY

The present inventors have developed a cable protection and guide device 500, as shown in FIG. 18, in which a number of pairs of spaced right and left side plate portions 510 are connected to each other from a mounting fixed end to a mounting movable end. Connecting arms 540 are respectively bridged over a flexional inner circumferential side and a flexional outer circumferential side of said side plate portions 510 at required intervals and a cable is accommodated in a cable accommodating space surrounded by the side plate portions 510 and the connecting arms 540 from the mounting fixed end toward the mounting movable end. The side plate portions 510 each have a link module with integrally molded side plates 522 and a number of coupling portions 524. Flexible coupling arms 526 extend from the coupling portions 524. Stopper links 530 are engaged between the adjacent side plates 522. Stopper links 520 are assembled to the coupling portion 524 by a snap-fit mechanism. The link module 520 has a male connecting plate 527 and a female connecting plate 528 which are respectively connected to other link modules 520. The male connecting plate 527 and the female connecting plate 528 are each formed in the same outer shape as that of the side plate 522 when respectively connected together. See, Japanese patent application No. 2007-247648.

Problems to be Solved by the Invention

However, in the above-mentioned conventional cable protection and guide device, mounting means at a mounting fixed end and a mounting movable end are not provided. Thus mounting brackets which mount a mounting fixed end and a mounting movable end, must be provided. A mounting method for a cable protection and guide device was heretofore troublesome. Further, since the whole length of the conventional cable protection and guide device cannot be adjusted with a finer resolution other than a unit of length of link modules, a plurality of link modules having different lengths were provided. Thus, the parts management load is increased and the number of molds increases as well resulting in higher manufacturing costs.

Accordingly, the present invention solves the above-mentioned problems. The object of the present invention is to provide a general purpose mounting bracket, which can be easily mounted onto a cable protection and guide device. Thus, the invention provides a cable protection and guide device of a specific desired length without the need for link modules of different length.

Means for Solving the Problems

The invention attains the above-mentioned objects. A cable protection and guide device includes link modules having a number of pairs side plates are connected to each other from a mounting fixed end to a mounting movable end. Connecting arms are respectively bridged over a flexional inner circumferential side and a flexional outer circumferential side of the side plate portions at required intervals and a cable is accommodated in a cable accommodating space surrounded by the side plate portions and the connecting arms from the mounting fixed end toward the mounting movable end. The side plates are formed as part of a link module. The link module includes integrally molded side plates connected with coupling portions. Flexible coupling arms extend from the coupling portions. Stopper links are engaged between adjacent side plates from a cable accommodating space side and are assembled to the coupling portion by a snap-fit mechanism. The link module has a male connecting plate and a female connecting plate connected to other link modules. The respective ends of the male connecting plate and the female connecting plate when connected are each formed in the same outer shape as that of the side plate. A bracket joint includes the coupling portion at one end of the bracket joint and the male connecting plate or female connecting plate at the other end thereof. The bracket joint is connectable to the link module.

The bracket joint includes as many link plates and coupling portions as is necessary. The number of coupling portions is controlled by cutting the coupling arm of the link module at a required length position. Mounting brackets are positioned at the mounting fixed end and the mounting movable end. The mounting brackets each engage with the coupling portion which exists at one end of the bracket joint. The coupling portion is fitted to the mounting bracket by a snap-fit mechanism.

It is noted that the language "side plates of a required number" in "the side plate portions each have a link module with integrally molded side plates of a required number through coupling portions and flexible coupling arms extended from the coupling portions" in the present invention contains an instance, example or case where there may be zero "0" side plates. That is, a link module which is a component of the present invention includes a male connecting plate and a female connecting plate which connects a respective coupling to the mounting brackets and the plates are connected to each other.

Effects of the Invention

According to the cable protection and guide device of the present invention, link modules include a number of pairs of spaced right and left side plate portions connected to each other from a mounting fixed end to a mounting movable end. Connecting arms are respectively bridged over a flexional inner circumferential side and a flexional outer circumferential side of the side plate portions at required intervals. A cable is accommodated in a cable accommodating space surrounded by the side plate portions and the connecting arms from the mounting fixed end toward the mounting movable end. A link module includes side plate portions integrally molded together by coupling portions. Flexible coupling arms extend from the coupling portions. Stopper links each engage between the adjacent side plates from a cable accommodating space side and are assembled to the coupling portion by a snap-fit mechanism. The link module has a male connecting plate and a female connecting plate. The male connecting plate and the female connecting plate are each formed in the same outer shape as that of the side plate when respectively connected to a female connecting plate and a male connecting plate of the adjacent link module. The connection strength between link modules is increased and at the same time the wall thicknesses of the male connecting plate and female connecting plate are equal to each other.

The device has a bracket joint which includes the coupling portion at one end of the bracket joint and the male connecting plate or female connecting plate at the other end thereof. The bracket joint is connectable to the link module. The number of the coupling portions is controlled by cutting the coupling arm of the link module at a required length position. The whole length of the cable protection and guide device can be precisely set without increasing the number of parts as explained above. The device has mounting brackets positioned at the mounting fixed end and the mounting movable end. The mounting brackets each engage with the coupling portion which exists at one end of the bracket joint. The coupling portion is fitted to the coupling portion by a snap-fit mechanism.

The cable protection and guide device includes a number of pairs of spaced right and left side plate portions connected to each other from a mounting fixed end to a mounting movable end. Connecting arms are respectively bridged over a flexional inner circumferential side and a flexional outer circumferential side of the side plate portions at required intervals. A cable is accommodated in a cable accommodating space surrounded by the side plate portions and the connecting arms from the mounting fixed end toward the mounting movable end. The side plate portions each have a link module with integrally molded side plates interconnected by coupling portions and flexible coupling arms extended from the coupling portions. Stopper links are engaged between the adjacent side plates from a cable accommodating space side and assembled to the coupling portion by a snap-fit mechanism. The link module has a male connecting plate and a female connecting plate which are respectively connected to link modules. The male connecting plate and the female connecting plate are each formed in the same outer shape as that of the side plate when respectively connected to a female connecting plate and a male connecting plate of the adjacent link module. The cable protection and guide device has a bracket joint which includes the coupling portion at one end of the bracket joint and the male connecting plate or female connecting plate at the other end thereof connectable to the link module. The length of the device is controlled by cutting the coupling arm of a coupling at a required length. Mounting brackets are positioned at the mounting fixed end and the mounting movable end of the device. The mounting brackets each engage with a respective coupling portion which exists at one end of a respective bracket joint. The bracket is fitted to the coupling portion by a snap-fit mechanism. A general purpose mounting bracket, which is easily mounted, is provided and the whole length of the cable protection and guide device can be precisely set without increasing the number of parts (modules of different length).

Engineering plastic resins such as polyamide 6, polyamide 12, polyamide 46, polyamide 66, polybutylene terephthalate, acryl, polyacetal and the like, which resist flexional strain liable to occur at the time of a flexional operation, exhibit excellent dimensional stability. The stopper link, the connecting arm, the bracket joint and the mounting bracket used in the cable protection and guide device of the present invention are preferably made of these engineering plastic resins. When these components are molded of fatigue resistant resin material in which elastomer or rubber component is mixed with polyamide resin or polybutylene terephthalate excellent dimensional stability is obtained. The elastomer or the rubber component mixed with polyamide resin or polybutylene terephthalate adds flexibility, which resists shock, and the shock resistance and fatigue resistance are excellent. Thus the elastomer or the rubber component is preferably used.

DESCRIPTION OF THE INVENTION

A cable protection and guide device, which is an embodiment of the present invention, will be described by use of FIGS. 1 to 17 below.

Figure 1:
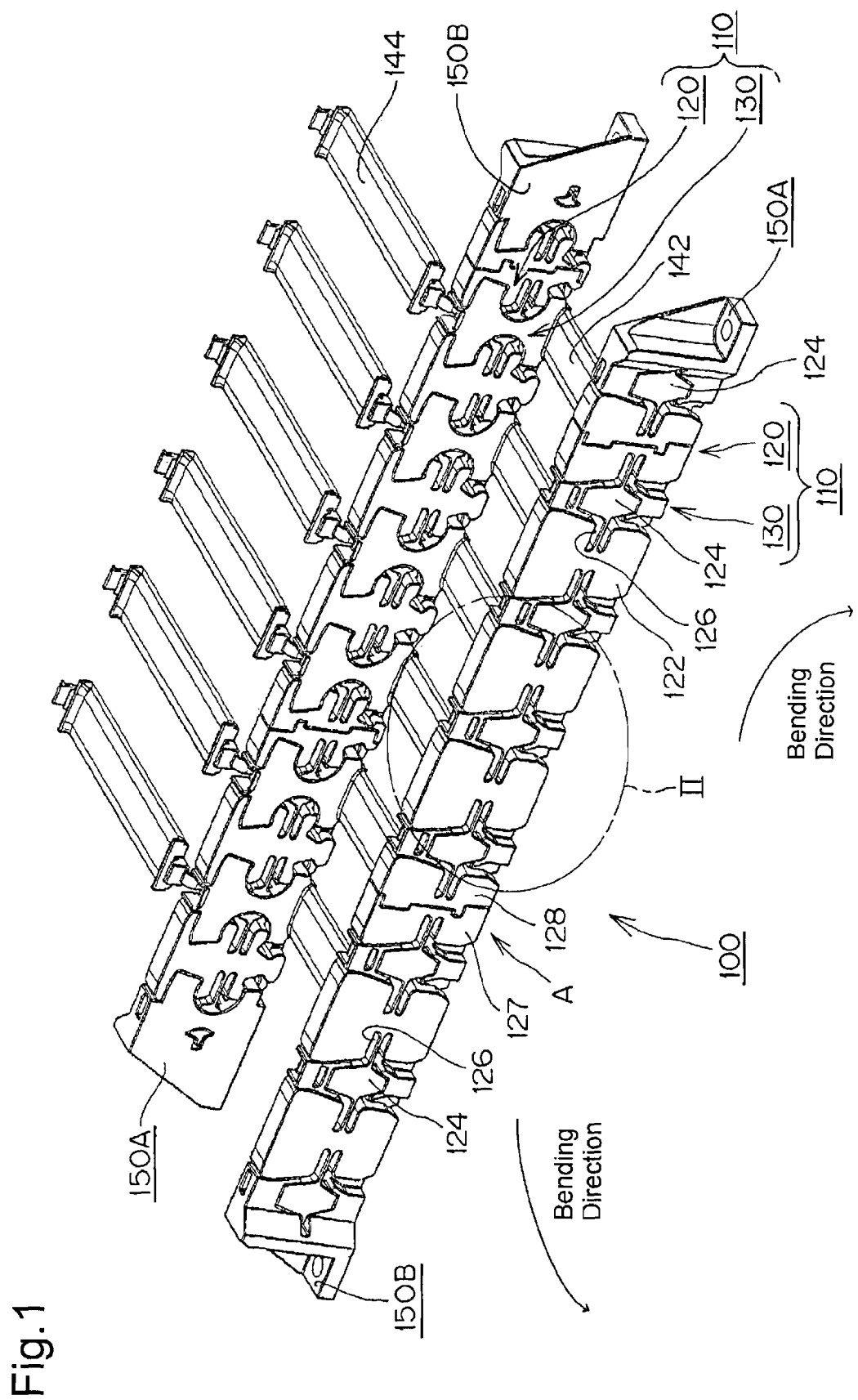
FIG. 1 is a perspective view showing a part of a cable protection and guide device 100 of the present invention.
Figure 2:
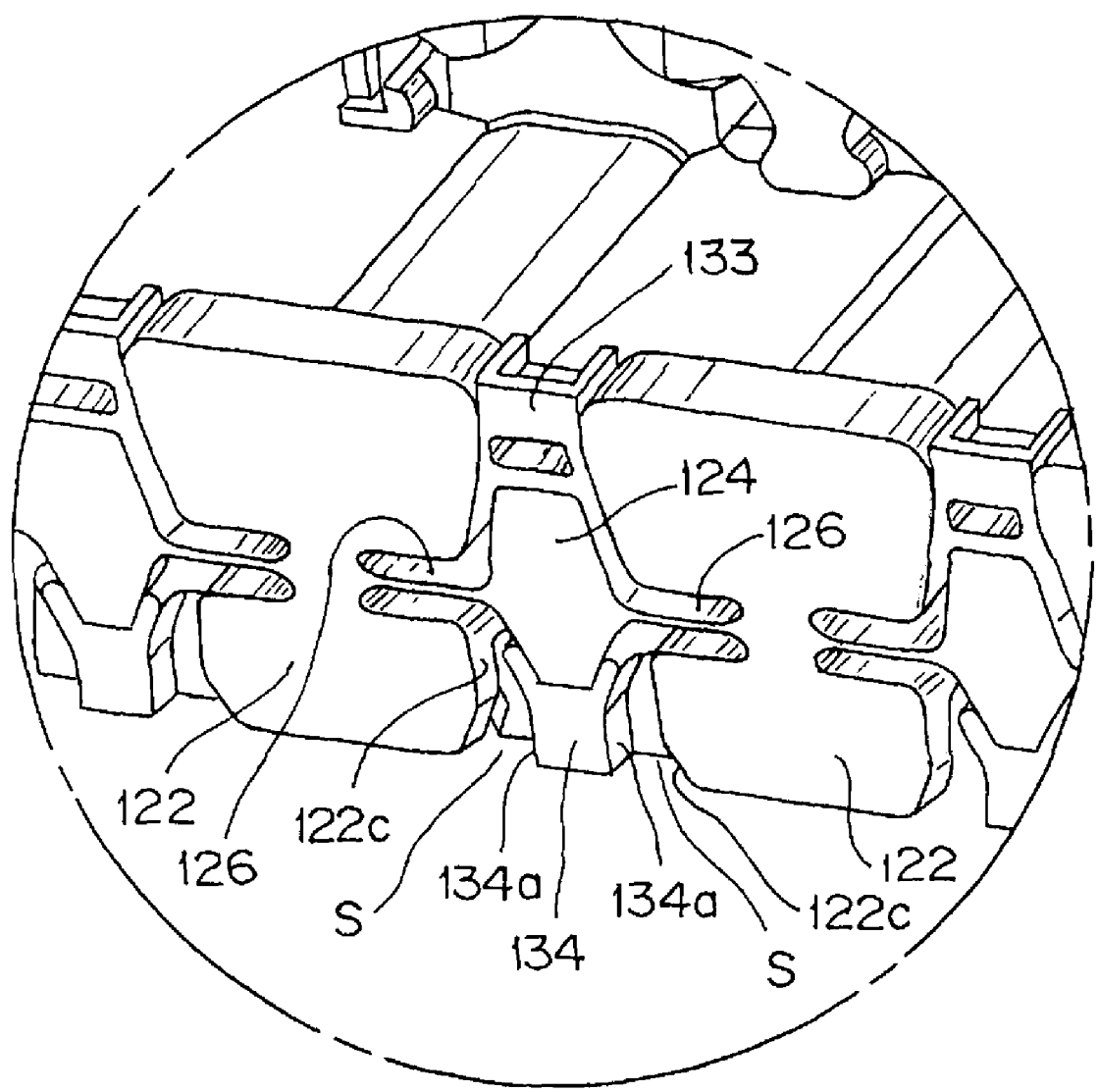
FIG. 2 is an enlarged view of a portion, II, of FIG. 1.
Figure 3:
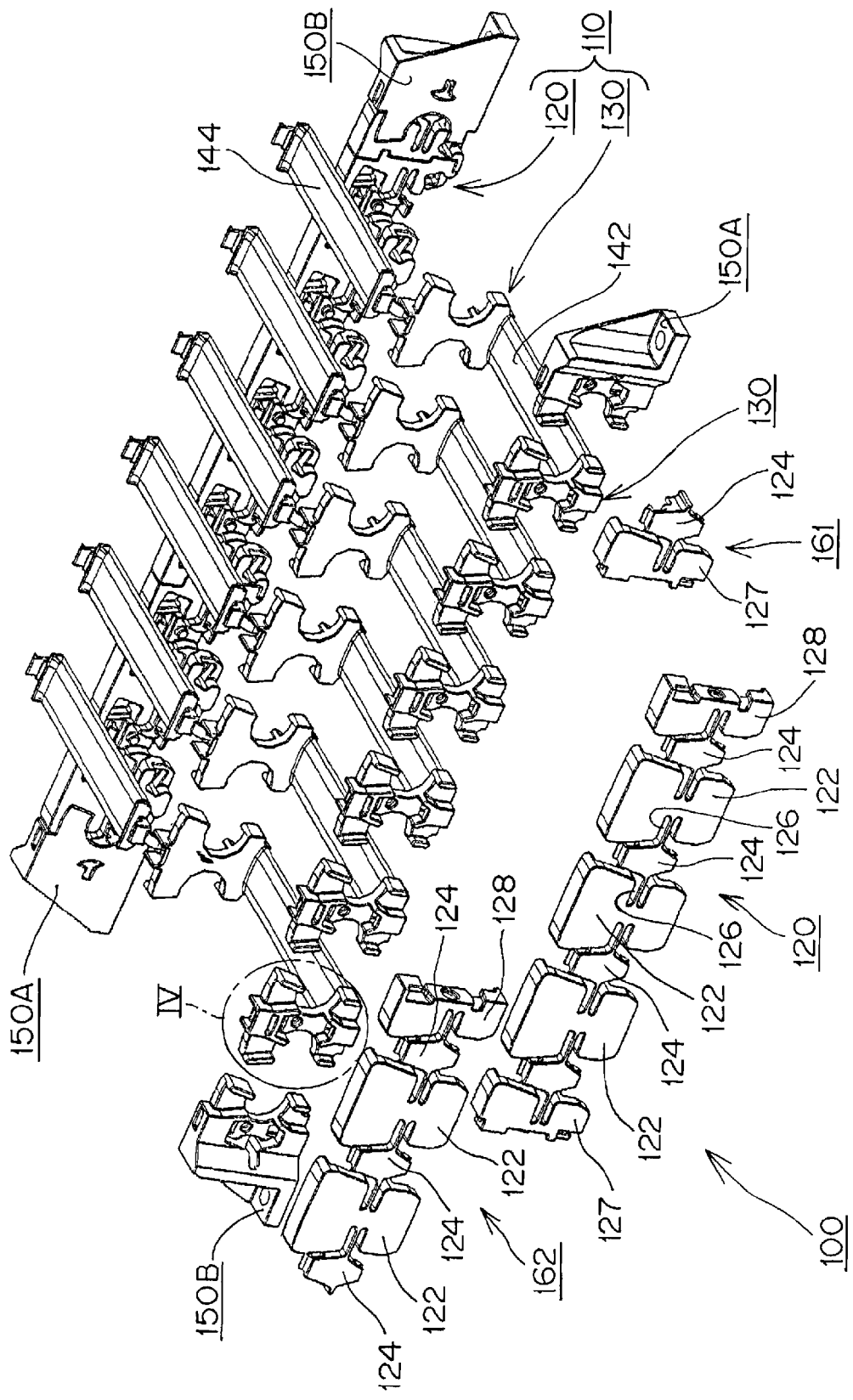
FIG. 3 is an exploded view of the cable protection and guide device 100 shown in FIG. 1.
Figure 4:
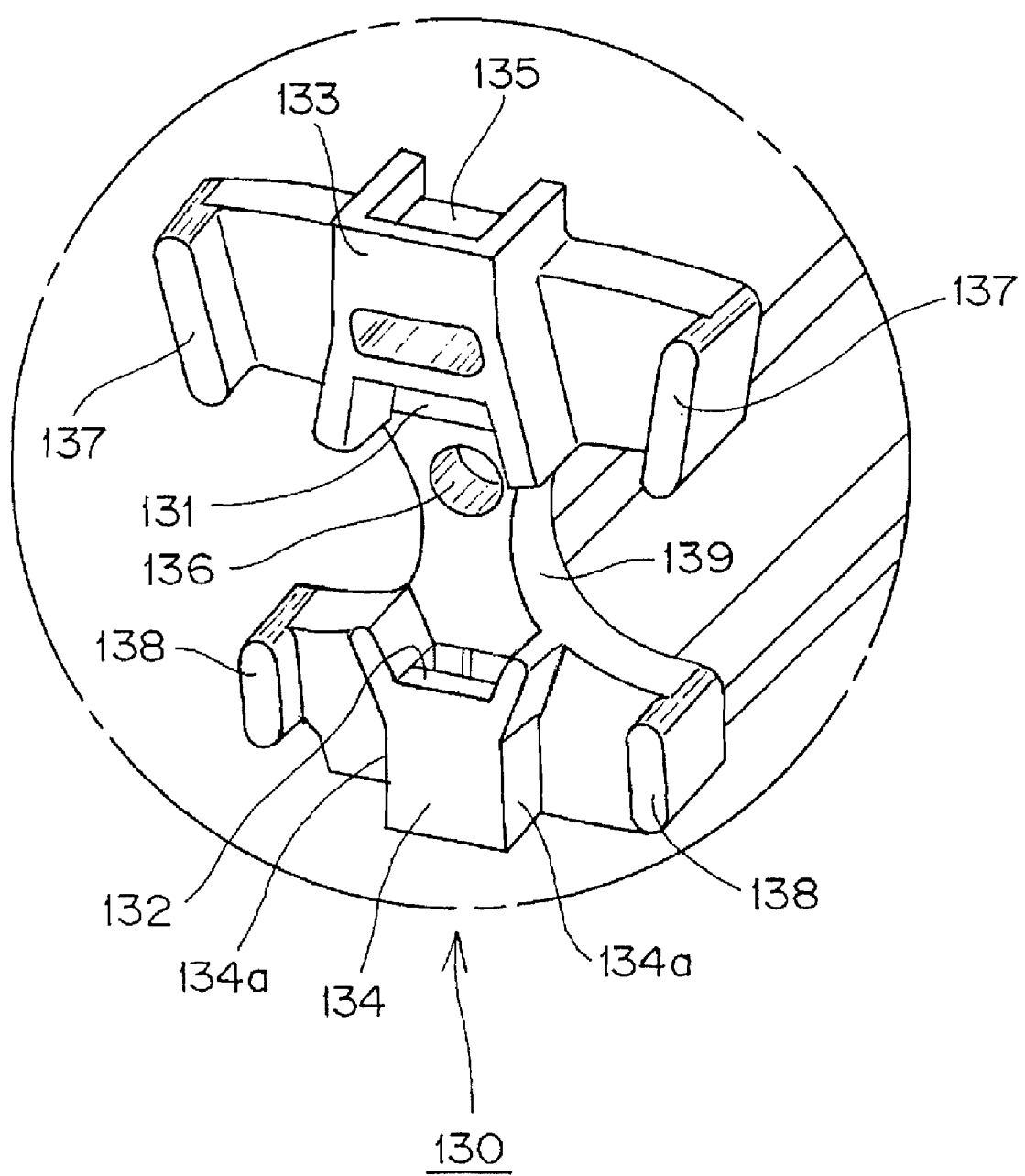
FIG. 4 is an enlarged view of a portion, IV, of FIG. 3.
Figure 5:
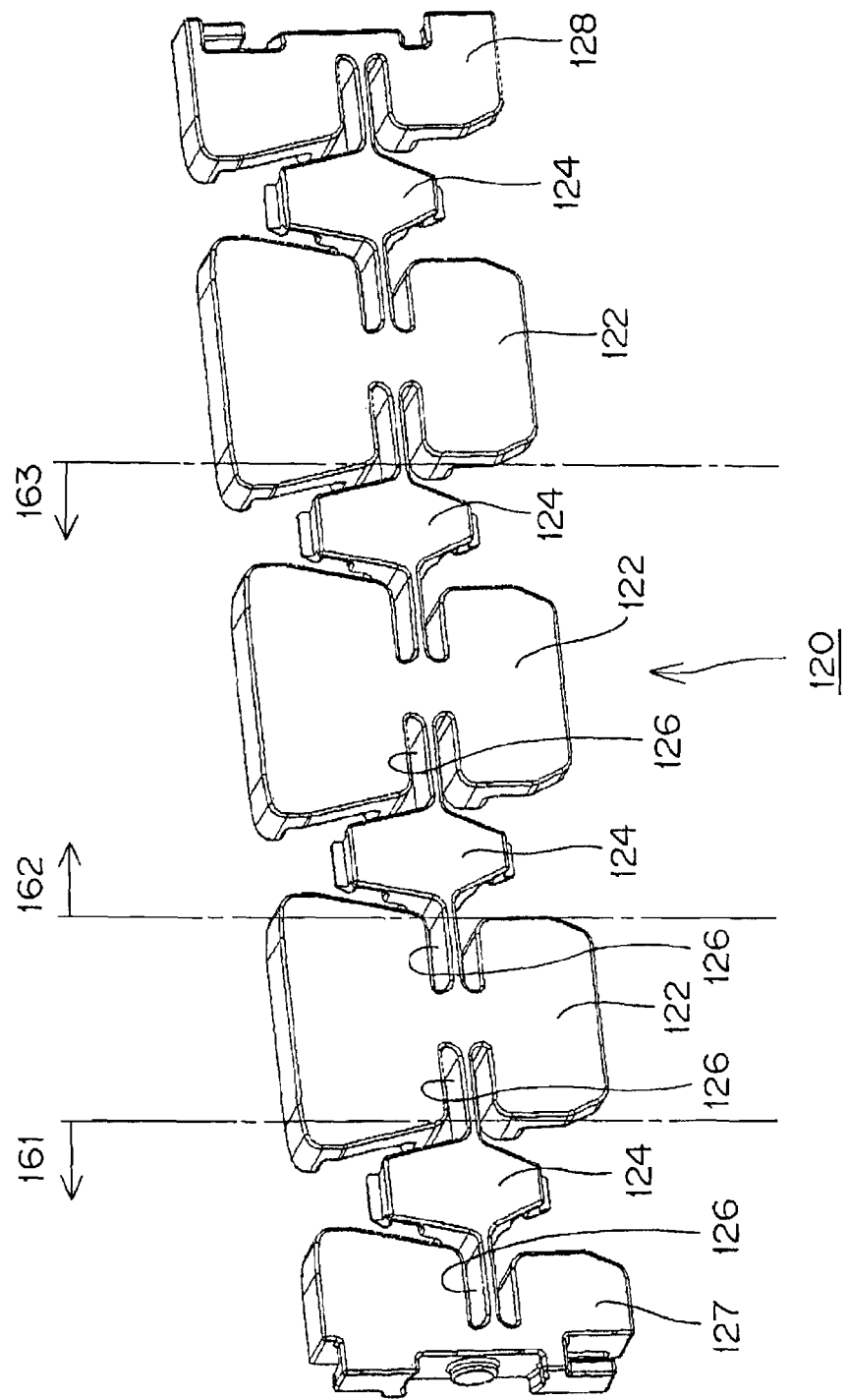
FIG. 5 is a perspective view of a link module viewed from the outside.
Figure 6:
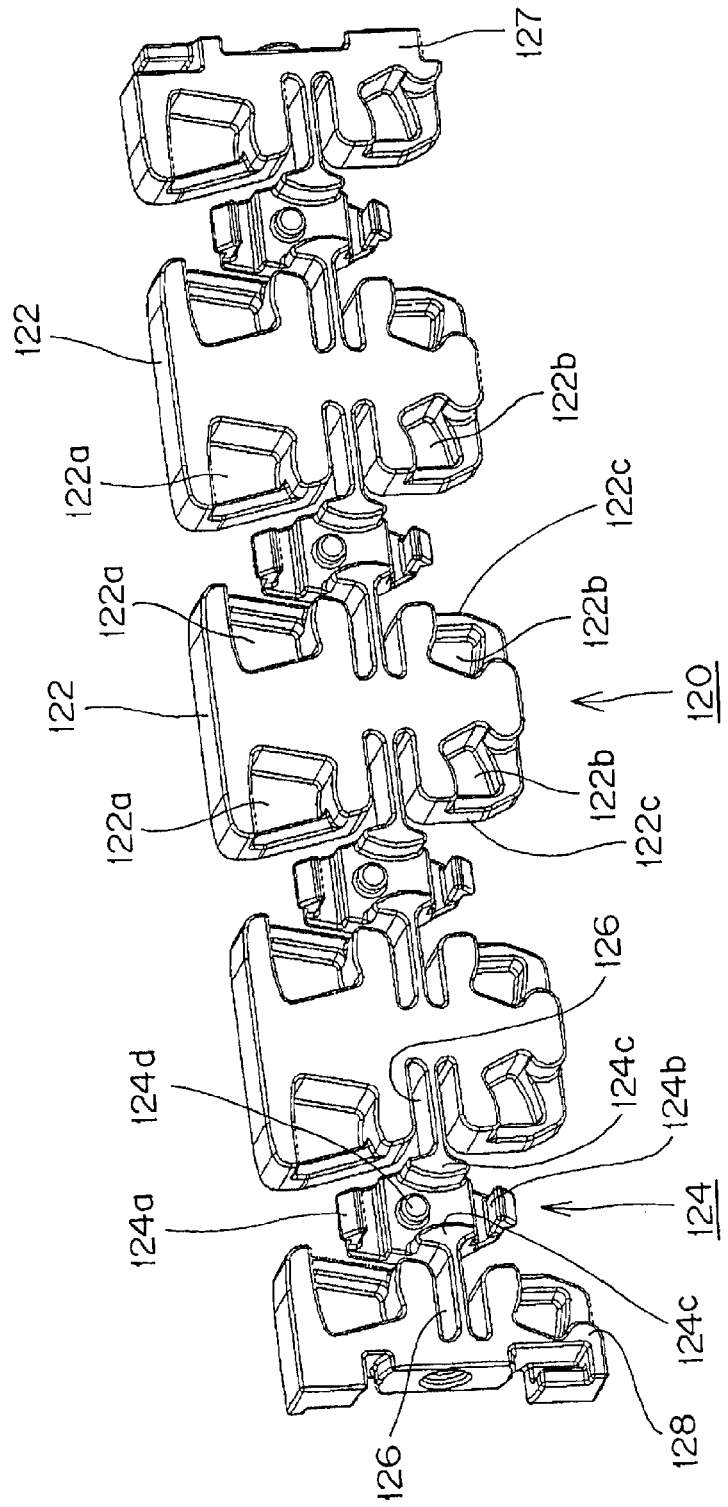
FIG. 6 is a perspective view of a link module viewed from the inside.
Figure 7:
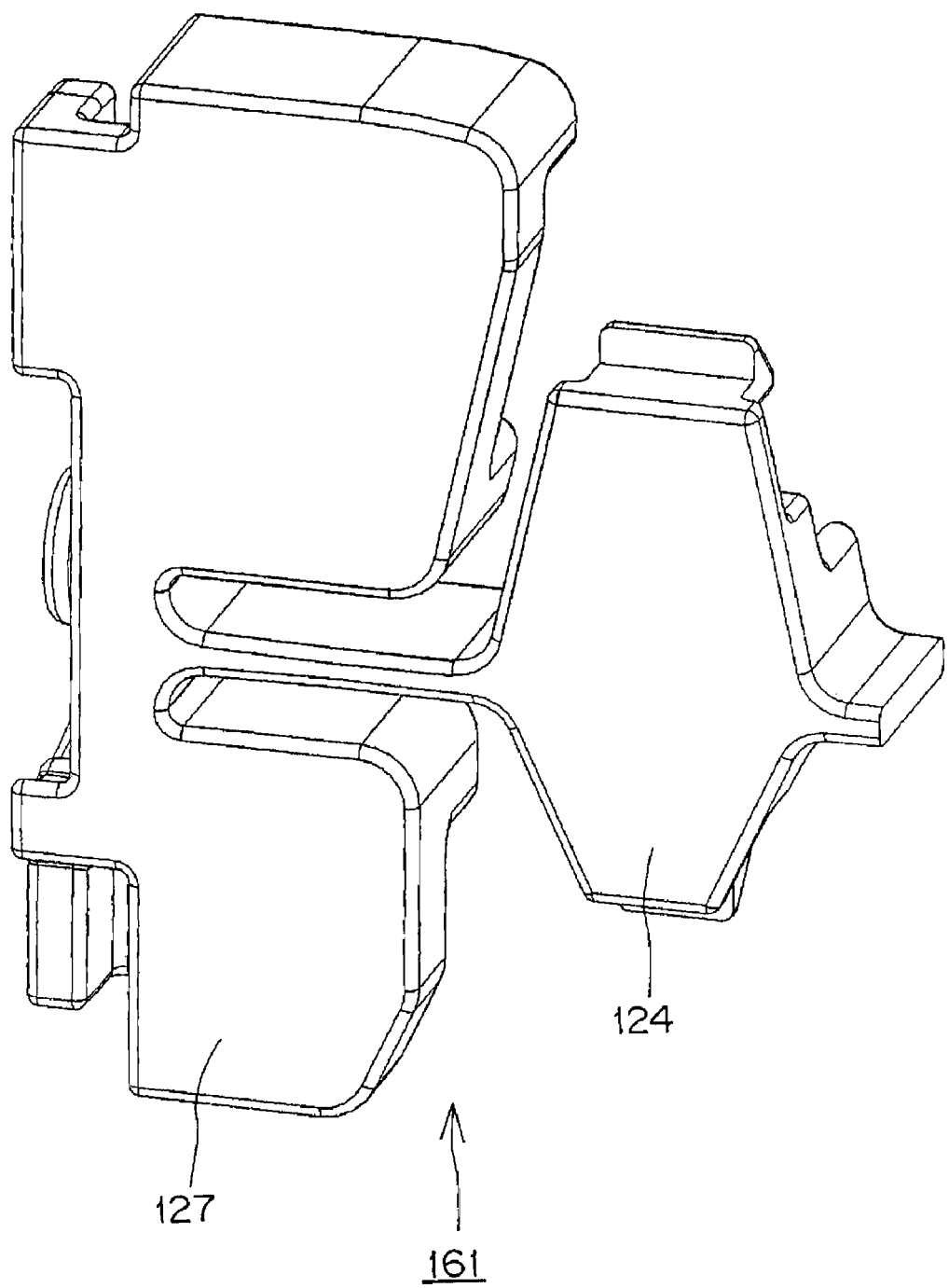
FIG. 7 is a perspective view of a one link bracket joint.
Figure 8:
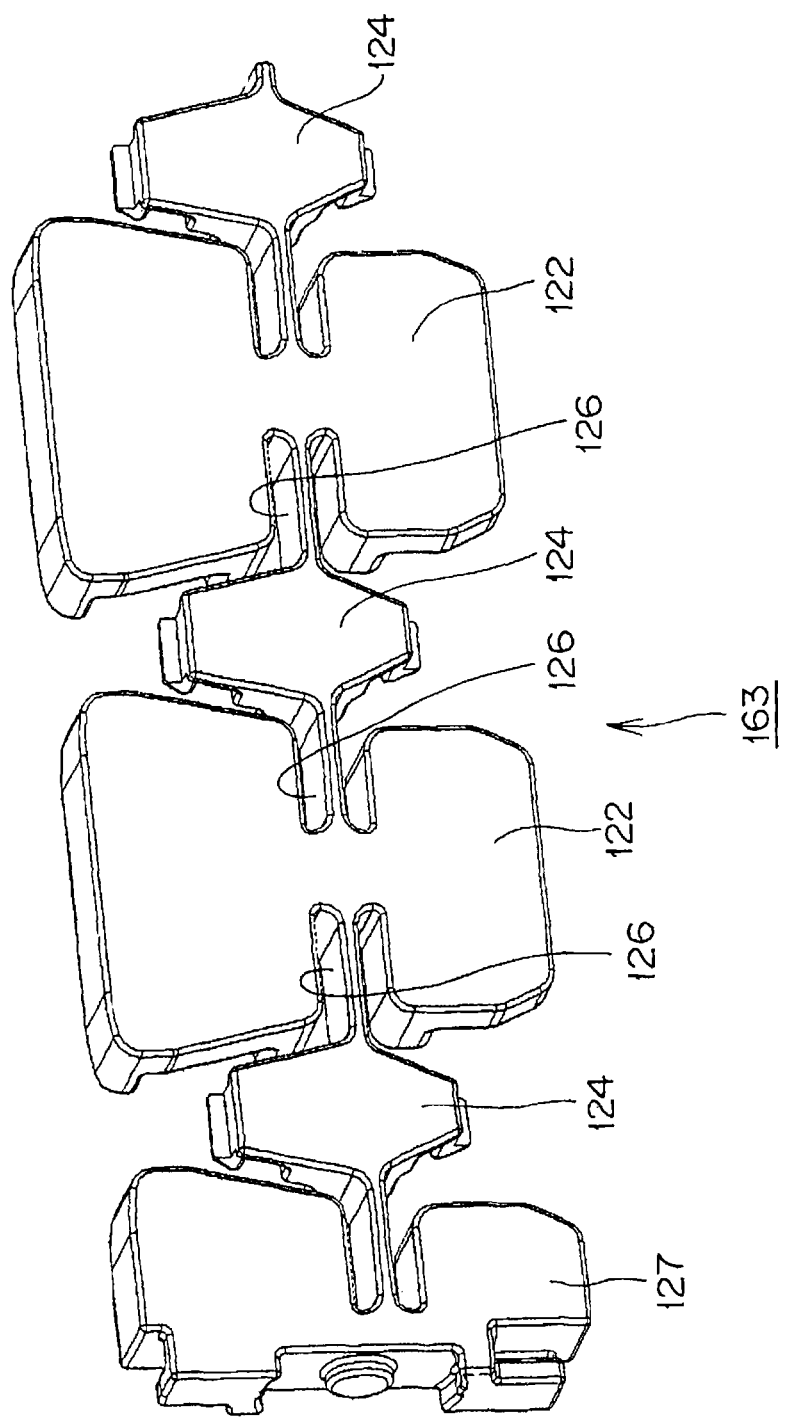
FIG. 8 is a perspective view of a three link bracket joint.
Figure 9:
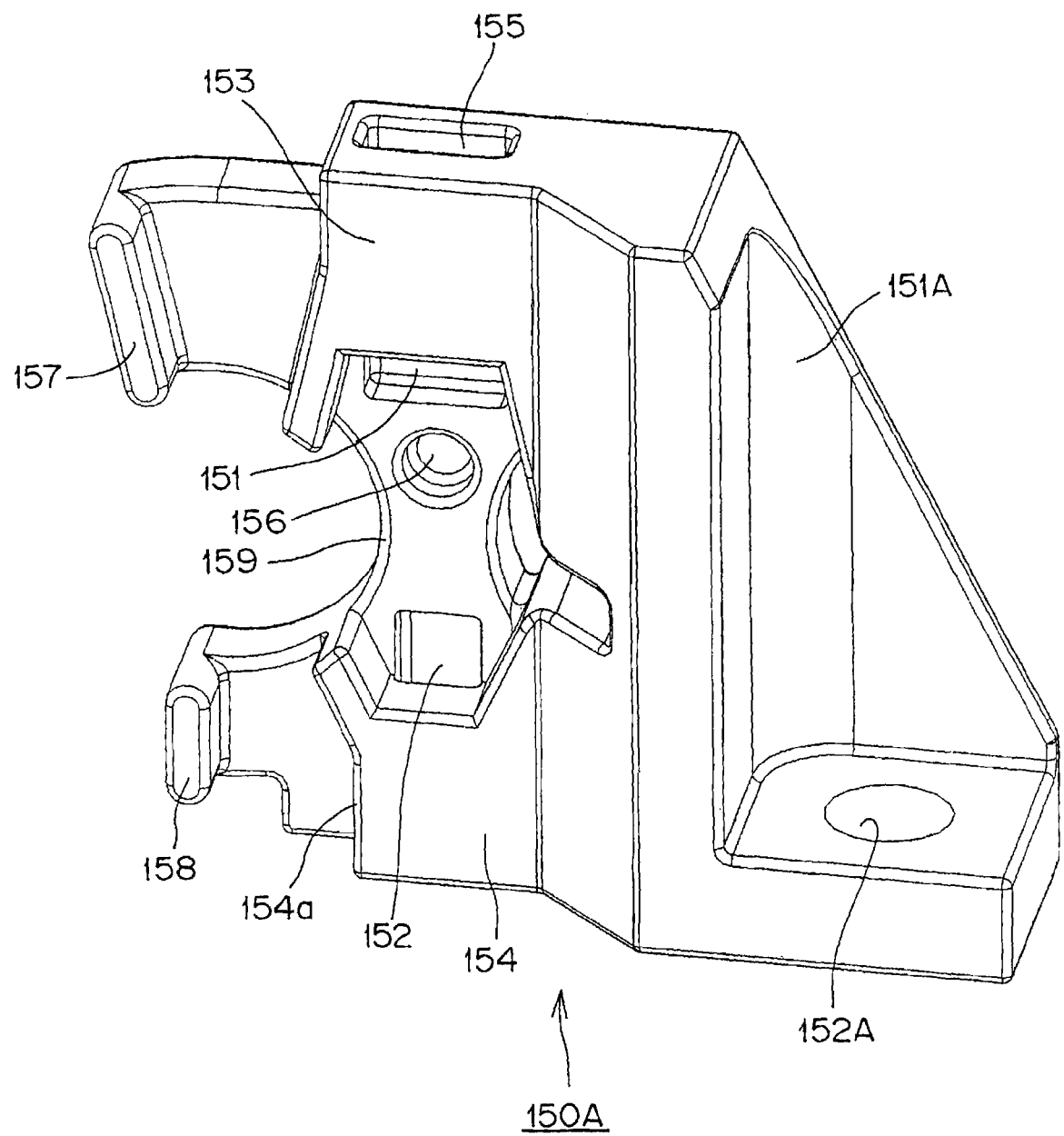
FIG. 9 is a perspective view of a mounting bracket.
Figure 10:
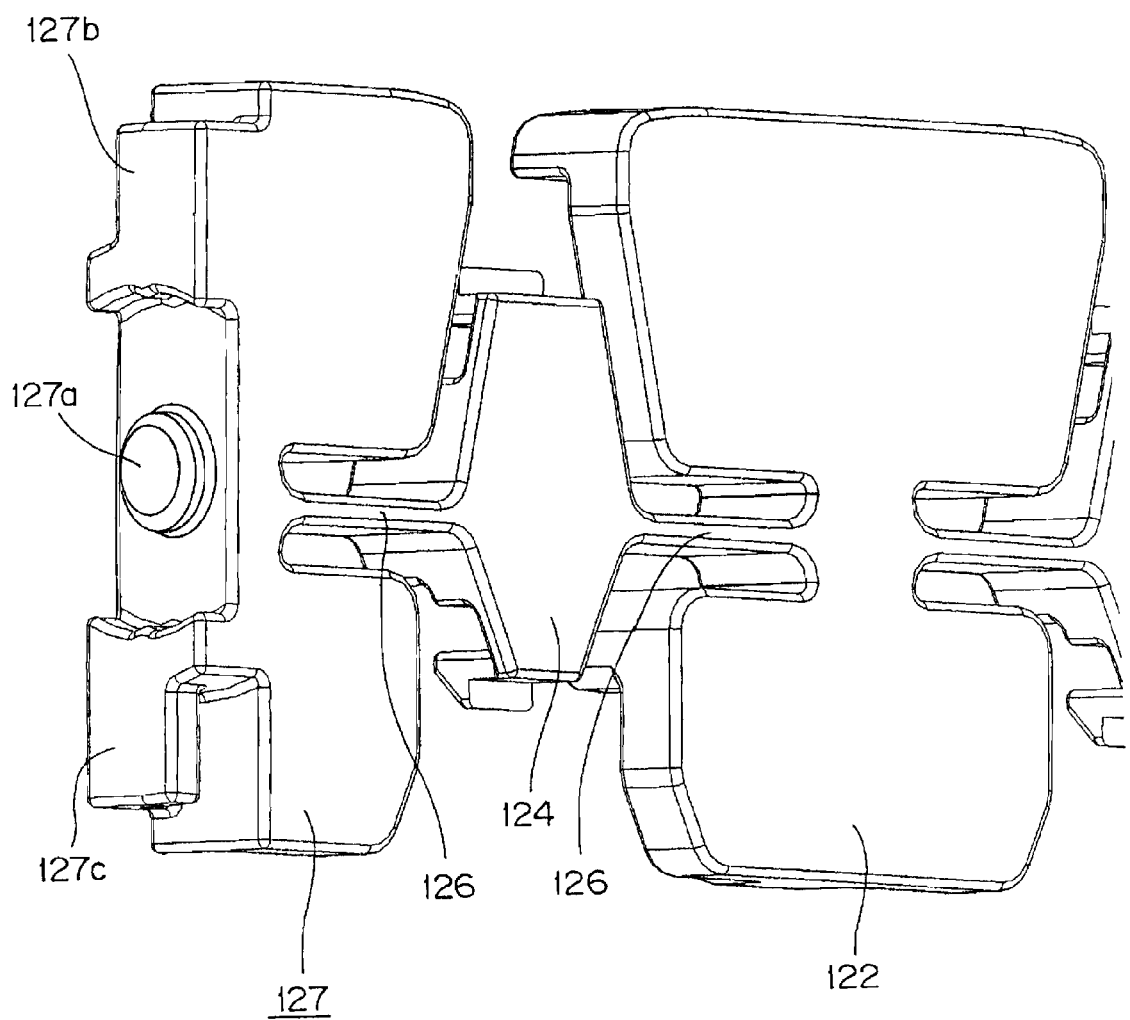
FIG. 10 is an enlarged perspective view of a male connecting plate.
Figure 11:
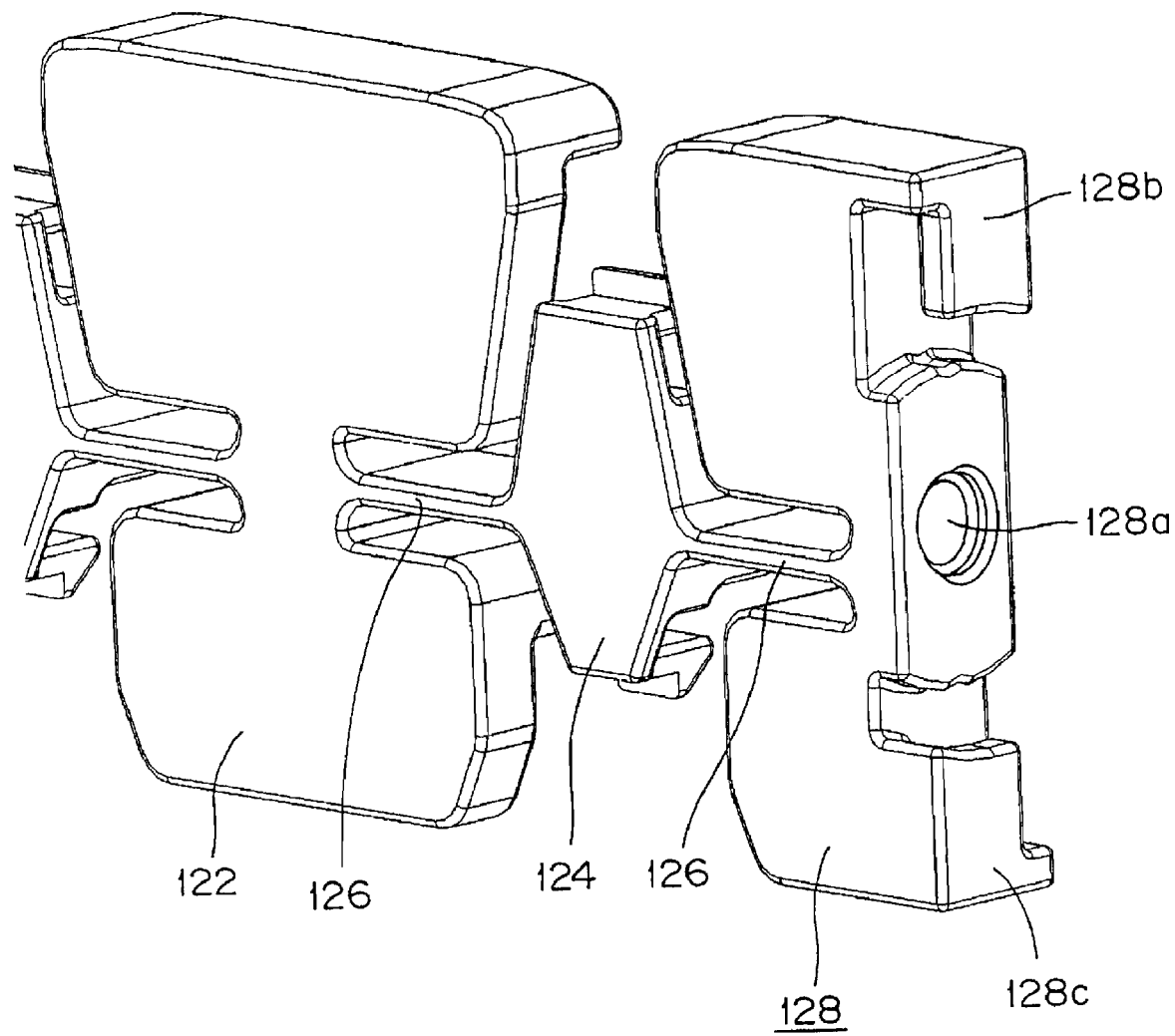
FIG. 11 is an enlarged perspective view of a female connecting plate.
Figure 16:
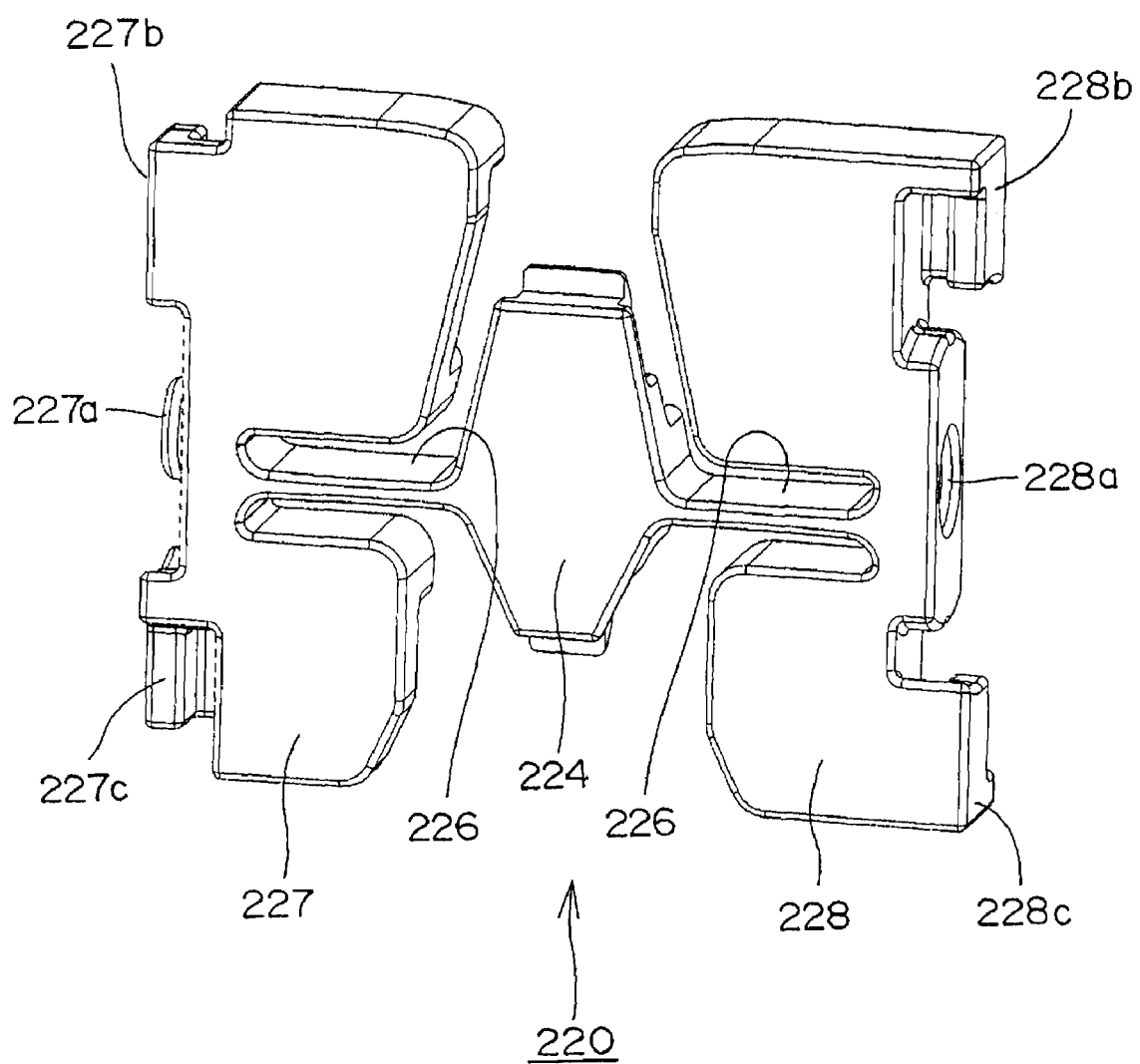
FIG. 16 is a perspective view when another shaped link module is viewed from the outside.
Figure 17:
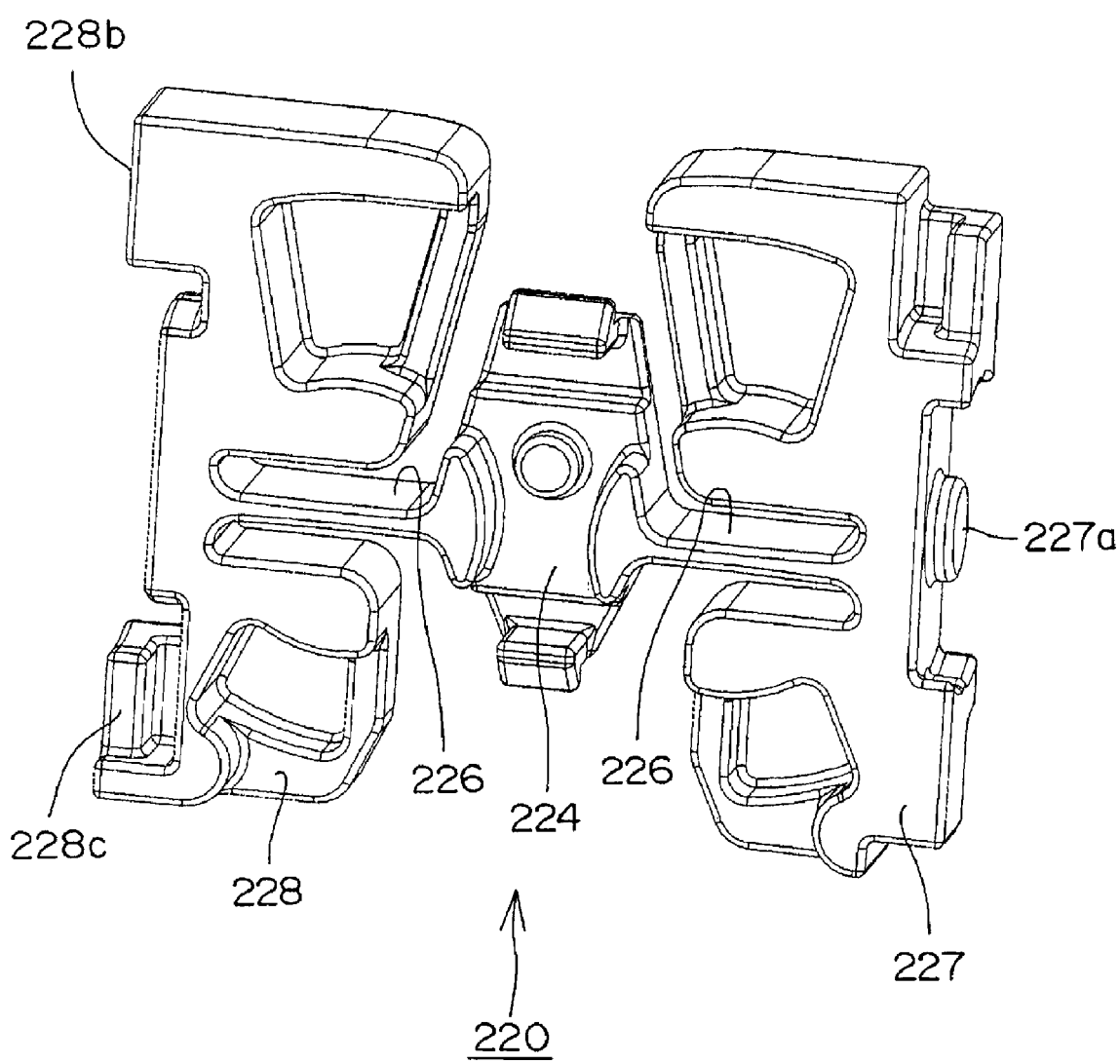
FIG. 17 is a perspective view of the link module shown in FIG. 16 viewed from the inside.
Figure 18:
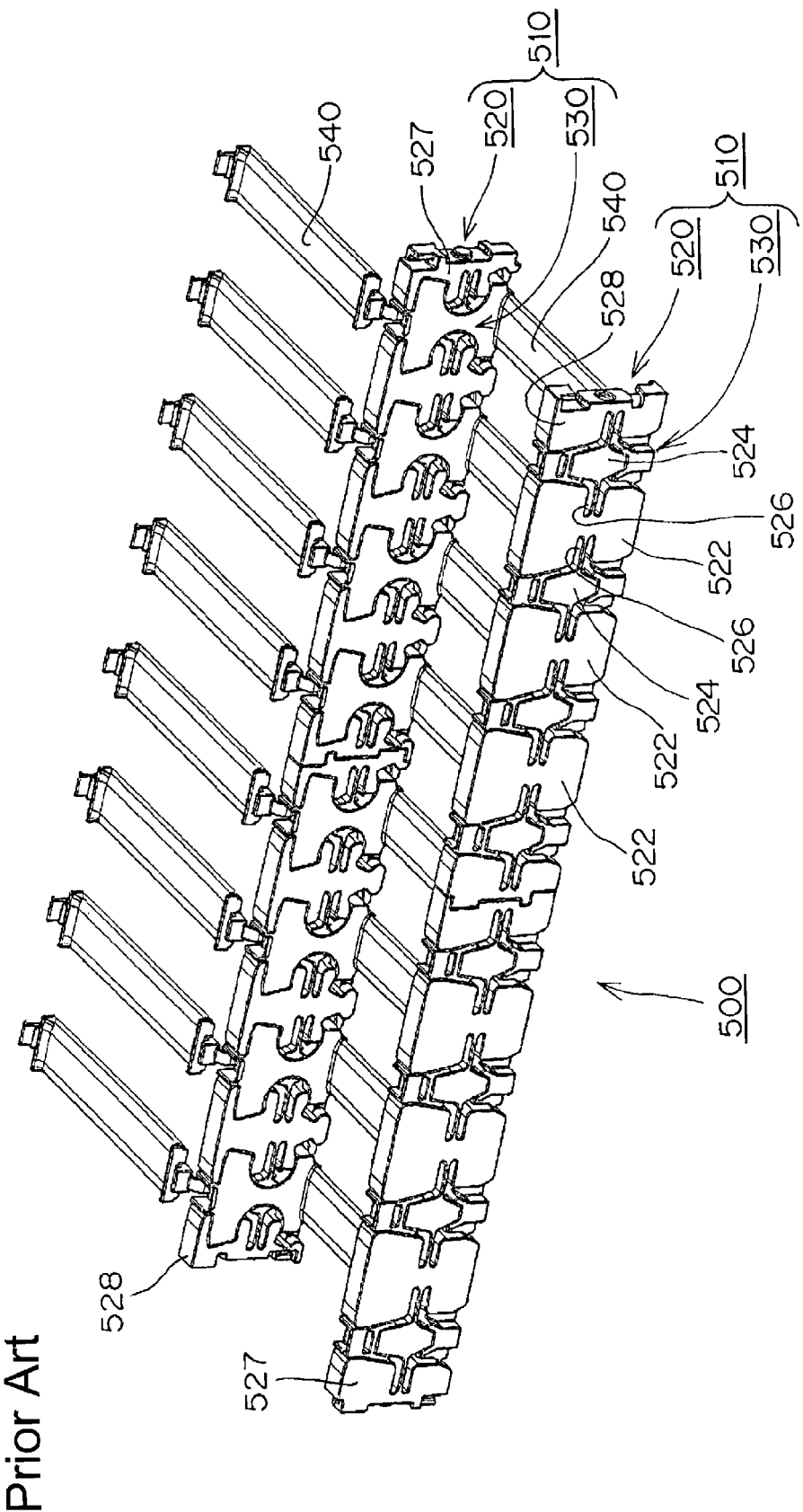
FIG. 18 is a perspective view of a conventional cable and the like protection and guide device.

FIG. 1 is a perspective view in which a cable protection and guide device 100 of the present example is shown with an opening/closing connecting arm 144 opened. FIG. 2 is an enlarged view of a portion of FIG. 1, namely the portion designated as "II". FIG. 3 is an exploded view before link modules 120, stopper links 130, bracket joints 161 and 162, mounting brackets 150A and 150B are assembled. FIG. 4 is an enlarged view of a portion of FIG. 3 denoted as "IV". Further, FIG. 5 is a perspective view when the link module 120 is viewed from the outside. FIG. 6 is a perspective view of the link module 120 shown in FIG. 5 is viewed from the inside that is from a cable accommodating space side. FIG. 7 is a perspective view of a bracket joint 161 having one coupling portion 124. FIG. 8 is a perspective view of a bracket joint 163 having three coupling portions 124. FIG. 9 is a perspective view obtained when a mounting bracket 150A is viewed from the outside. FIG. 10 is an enlarged perspective view of a male connecting plate 127. FIG. 11 is an enlarged perspective view of a female connecting plate 128. FIGS. 12 to 15 are state views shown when the male connecting plate 127 and the female connecting plate 128 are connected to each other by a rotation type snap-fit mechanism. FIG. 16 is a perspective view when another shaped link module 220 is viewed from the outside. FIG. 17 is a perspective view of the link module 220 shown in FIG. 16 viewed from the inside that is from a cable accommodating space side.

The cable protection and guide device 100 of the present example is used for protecting and guiding a cable such as an electric cable which connects between a stationary portion and a movable portion in a semiconductor device, a pharmaceutical development testing device, a vehicle door opening/closing device and the like. The cable within the device transmits electric signals and supplies power. A hose, which supplies pressure liquid or pressure air, may also be housed within the device. In the cable protection and guide device 100, a number of link modules forming pairs of spaced right and left side plate portions 110 are connected to each other from a mounting fixed end, which is secured to a stationary portion, toward a mounting movable end, which is secured to a movable portion. Fixed connecting arms 142 and opening/closing connecting arms 144 are respectively bridged over a flexional inner circumferential side and a flexional outer circumferential side of the side plate portions 110 at required intervals and a cable (not shown) is accommodated in a cable accommodating space exhibiting a rectangular cross section surrounded by pairs of right and left side plate portions 110, fixed connecting arms 142 and opening/closing connecting arms 144 from the mounting fixed end toward the mounting movable end.

The side plate portion 110 has a link module 120 having a required number of side plates 122 integrally molded through diamond-shaped coupling portions 124 and flexible coupling arms 126 extended from these coupling portions 124. Stopper links 130 are engaged with side plates 122 therebetween and incorporated to the coupling portion 124 by a snap-fit mechanism. In this example the number of side plates 122 forming one link plate 120 is three.

Further, as shown in FIG. 3, a fixed connecting arm 142 is integrally molded to a flexional inner circumferential side of a pair of right and left stopper links 130. An end of an opening/closing connecting arm 144 is flexibly, integrally molded to a flexional outer circumferential side of the pair of right and left stopper links 130. The other end of the opening/closing connecting arm 144 is removably molded to the other flexional outer circumferential side of the pair of right and left stopper links 130. As a result, a pair of right and left stopper links 130, a fixed connecting arm 142 and an opening/closing connecting arm 144 form one part. The number of parts is reduced. Therefore, since the pair of right and left stopper links 130 are independent assembly is reduced.

Here a connection structure between the link module 120 and the stopper link 130 and its function will be described.

As shown in FIGS. 1 to 3, the stopper link 130 is incorporated to a coupling portion 124 of the link module 120 from a cable accommodating space side by a snap-fit mechanism whereby the flexional inner circumferential side and flexional outer circumferential side flexional angles are restricted.

In the present example, an upper end convex portion 124a provided on an upper end portion of the diamond-shaped coupling portion 124 shown in FIG. 6 is engaged with an upper concave portion 131 provided on an upper portion of the stopper link 130 shown in FIG. 4. At the same time a lower end convex portion 124b provided on a lower end portion of the coupling portion 124 is engaged with a lower concave portion 132 provided on a lower portion of the stopper link 130, so that a snap-fit mechanism is formed. A cylindrical columnar convex portion 124d is protrudently provided at a slightly upper portion of the center of the coupling portion 124 shown in FIG. 6 is fitted to a circular recess portion 136 provided at a slightly upper portion of the center of the stopper link 130 shown in FIG. 4. As such, the connection between the coupling portion 124 and the stopper link 130 is strengthened.

Upper portion side convex portions 137 of the stopper link 130 shown in FIG. 4 are accommodated into a back side of a side plate 122 shown in FIG. 6. Upper engagement regions 122a are formed on upper right and left portions on the cable accommodating space side. Lower portion side convex portions 138 of the stopper link 130 shown in FIG. 4 are accommodated into lower engagement regions 122b formed on lower right and left portions of a back side of the side plate 122 as shown in FIG. 6. Further, an arc-shaped convex portion 124c formed on the cable accommodating space side of the coupling portion 124 shown in FIG. 6. abuts on an arc-shaped portion 139 of the stopper link 130.

The stopper link 130 (shown in FIG. 4) includes an integrally molded coupling portion upper supporting portion 133 and a coupling portion lower supporting portion 134 which supports a coupling portion 124 formed between the side plates 122 of the link module 120 from the upper and lower portions. As shown in FIG. 2, the coupling portion upper supporting portion 133 fits into upper side surfaces of adjacent side plate portions 122. An upper side surface of the coupling portion 124 is formed between the adjacent side plates 122. The instant structure restricts a flexional outer circumferential side of the cable protection and guide device 100 so that the flexional outer circumferential side is not flexed beyond a substantially straight line. It is noted that a portion denoted by the reference numeral 135 in FIG. 4 is an engagement concave portion with which an opening/closing end of the opening/closing connecting arm 144 is engaged.

The coupling portion lower supporting portion 134 of the stopper link 130 abuts on a lower portion of the coupling portion 124 formed between adjacent side plates 122 and 122. Clearances, S, are shown in FIG. 2 between side plates 134a of the coupling portion and lower supporting portion 134 and lower side surfaces 122c of the adjacent side plates 122 and 122. As shown in FIG. 2, a side plate 134a of the coupling portion lower supporting portion 134 abuts on a lower side surface 122c of the side plate 122 to restrict the flexional angle on a flexional inner circumferential side of the cable protection and guide device. Therefore, excessive flexional stress is not applied to the coupling arm 126 resulting in improvement of the endurance of the device.

Next, a bracket joint, which is a principal component of the present invention will be described. As shown in FIG. 3, by denoting bracket joints with reference numerals 161 and 162, these bracket joints 161 and 162 are respectively connected between a link module 120 and mounting brackets 150A, 150B, so that the whole length of a cable protection and guide device 100 can be precisely set. These bracket joints 161 and 162 can be formed by cutting the appropriate coupling arm 126 of a link module 120 at the required length position. Each assumes a shape of having a coupling portion 124 at one end and a male connecting plate 127 or a female connecting plate 128 at the other end. A coupling portion 126 in a link module 120 shown in FIG. 5 is cut through a position 161 so that one link of a bracket joint 161 shown in FIG. 3 is formed and comprises a male connecting plate 127 and one coupling portion 124. FIG. 7 is a perspective view of an enlarged bracket joint 161. In the same manner, a coupling arm 126 is cut from the link module 120 shown in FIG. 5 at position 162 forming the three links of bracket joint 162 shown in FIG. 3 comprising a female connecting plate 128 and three coupling portions 124. Further, a coupling portion 126 in a link module 120 shown in FIG. 5 is cut through a position 163, so that three links of bracket joint 163 shown in FIG. 8 and comprises a male connecting plate 127 and three coupling portions 124 and two side plates 122. This bracket joint 163 is used at a position opposite to the bracket joint 162 shown in FIG. 3 that is the bracket joint 163 and the bracket joint 162 are used in a pair.

As described above, by cutting the coupling arm 126 of the link module 120 through a required position with a cutter, a bracket joint can be easily formed, which has, at one end, a coupling portion 124 incorporated with a length-controlled mounting bracket and a connecting plate at the other end. The coupling includes a snap-fit mechanism. The number of coupling portions 124 is thus controlled. At the other end is a female connecting plate 128 or a male connecting plate 127, which respectively connect a male connecting plate 127 or a female connecting plate 128 of the link module. Further, since the bracket joint has the same configuration as the link module except that one end of the bracket joint is a coupling portion 124, the connection between the stopper link 130 and the bracket joint is performed in the same manner as the connection between the above-mentioned link module 120 and the stopper link 130. Therefore, in this example it is not necessary to provide an additional metal mold for manufacturing a bracket joint, and thus assembly is simplified.

Next, a mounting bracket, which is another principal component of the present invention will be described. Mounting brackets are denoted by reference numerals 150A and 150B in FIGS. 1 and 3 and exist at a mounting fixed end and a mounting movable end of a cable protection and guide device 100. These mounting brackets 150A and 150B are respectively secured to a stationary portion and a movable portion in for example a semiconductor device, a pharmaceutical development testing device, a vehicle door opening/closing device and the like. The mounting bracket 150A and the mounting bracket 150B shown in FIGS. 1 and 3 have a mirror relationship therebetween and are respectively provided at a mounting fixed end and a mounting movable end. A coupling portion 124 which exists at one end of the above-mentioned bracket joint includes a snap-fit mechanism and is attached to the mounting brackets.

An enlarged perspective view of a mounting bracket 150A is shown in FIG. 9. As apparent from FIG. 9, the mounting bracket 150A is integrally molded while replacing one side of a stopper link for a mounting portion 151A. In the mounting portion 151A is provided a through hole 152A for inserting a bolt for fixing the mounting bracket. A portion having the same shape as a stopper link of the mounting bracket 150A is connected to a coupling portion 124 (see FIGS. 7 and 8) which exists at one end of a bracket joint by the same connected structure between the above-mentioned link module 120 and the stopper link 130. At the same time the stopper link 130 engages with a male connecting plate 127 (see FIG. 7) or a side plate 122 (see FIG. 8) connected to the coupling portion 124. It is noted that in a case of a mounting bracket 150B having a relationship of a mirror image to the mounting bracket 150A, a portion having the same shape as a stopper link of the mounting bracket 150B is connected to a coupling portion 124 (not shown). At the same time the portion having the same shape as the stopper link engages with a female connecting plate 128 or a side plate 122 connected to the coupling portion 124. It is noted that since the connection between the mounting bracket and the bracket joint is the same as a connected structure between the above-mentioned link module 120 and a stopper link 130, the detailed explanation of portions corresponding to the stopper link 130 shown in FIG. 4 will be omitted by replacing reference numerals of 130s for reference numerals of 150s in FIG. 9.

Next, a connection mechanism between link modules 120 will be described. A link module 120 has a male connecting plate 127 and a female connecting plate 128, which are respectively connected to link modules adjacent to its both ends, as shown in FIGS. 5 and 6. When the male connecting plate 127 and the female connecting plate 128 are respectively connected to a female connecting plate 128 and a male connecting plate 127 of adjacent link modules 120, they have the same outer shape as that of the side plate 122 as shown in a portion A in FIG. 1.

The male connecting plate 127 is provided at one end of the link module 120 as shown in FIG. 10. The outer shape of the male connecting plate 127 has such an outer shape that the side plate 122 is cut at a vertical center line and has a cylindrical columnar convex portion 127a at the center of its end surface. An upper engagement pawl portion 127b and a lower engagement pawl portion 127c are integrally molded at upper and lower symmetrical positions using convex portion 127a as the center.

The female connecting plate 128 is provided at the other end of the link module 120 as shown in FIG. 11. The outer shape of the female connecting plate 128 also has such an outer shape that the side plate 122 is cut at a vertical center line and has a circular concave portion 128a at the center of its end surface. An upper engagement pawl portion 128b and a lower engagement pawl portion 128c are integrally molded at upper and lower symmetrical positions using this concave portion 128a as the center.

Figure 12:
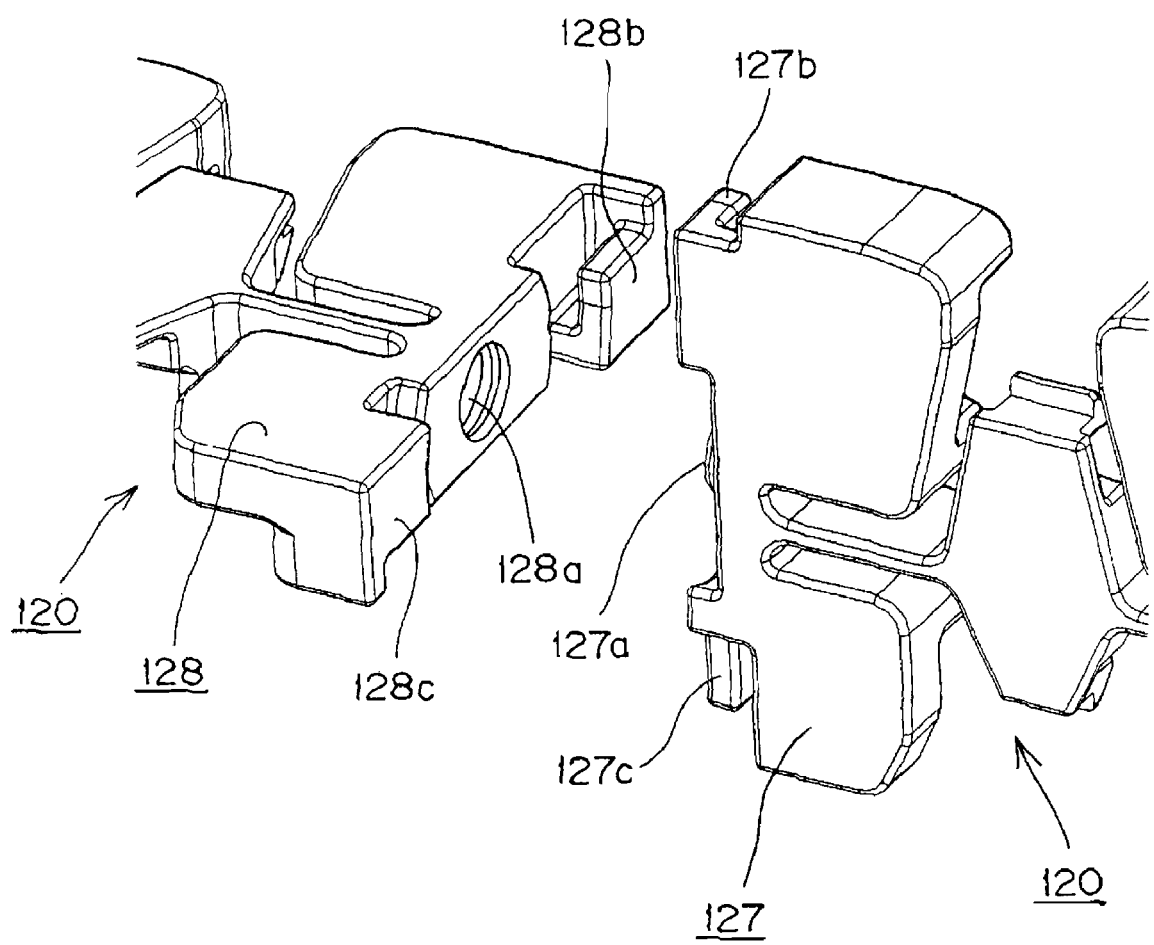
FIG. 12 is a view when the male connecting plate and the female connecting plate are connected by a rotation type snap-fit mechanism (before connection).
Figure 13:
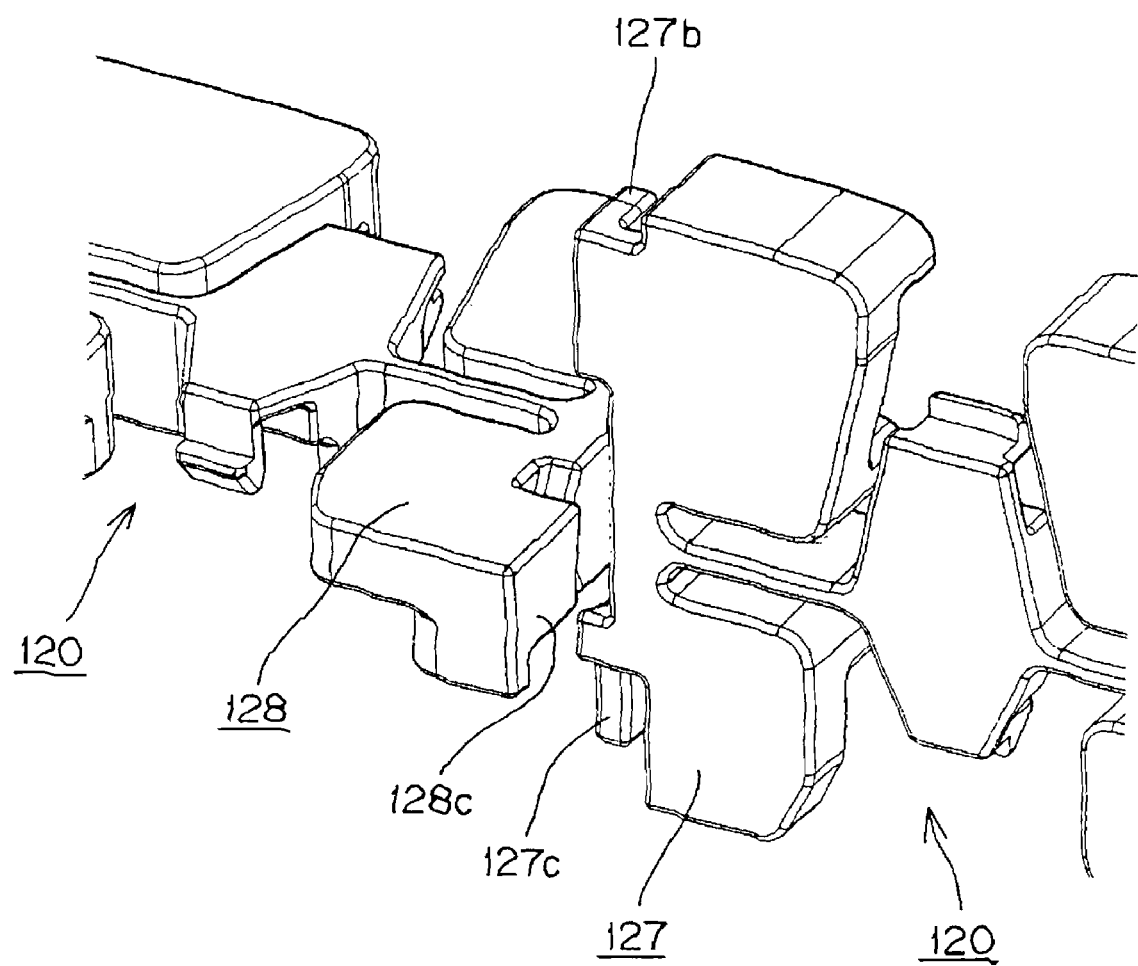
FIG. 13 is a view when the male connecting plate and the female connecting plate are connected by a rotation type snap-fit mechanism (at the time of fitting between convex portion and concave portion).
Figure 14:
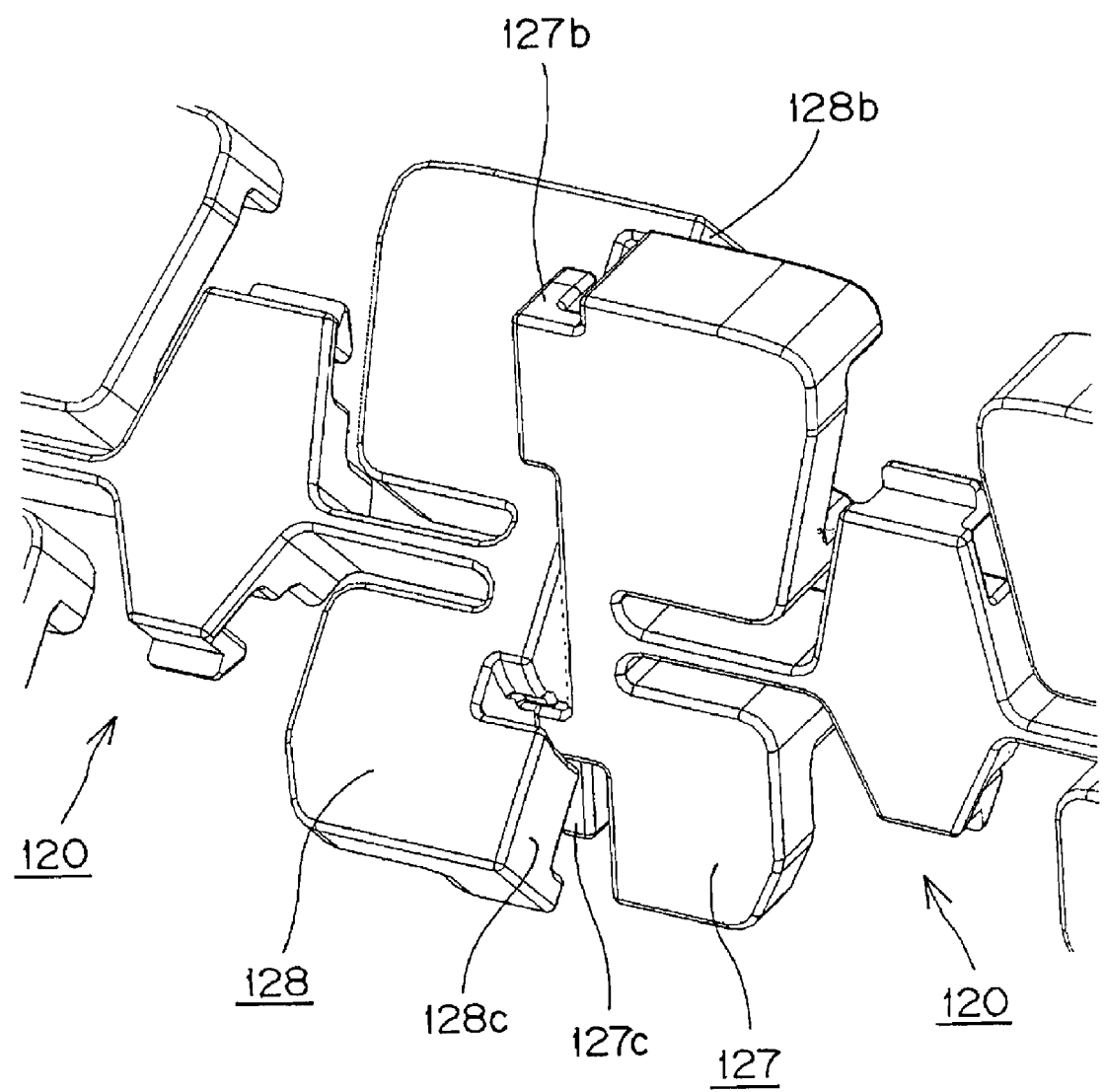
FIG. 14 is a view when the male connecting plate and the female connecting plate are connected by a rotation type snap-fit mechanism (at the time of rotation).
Figure 15:
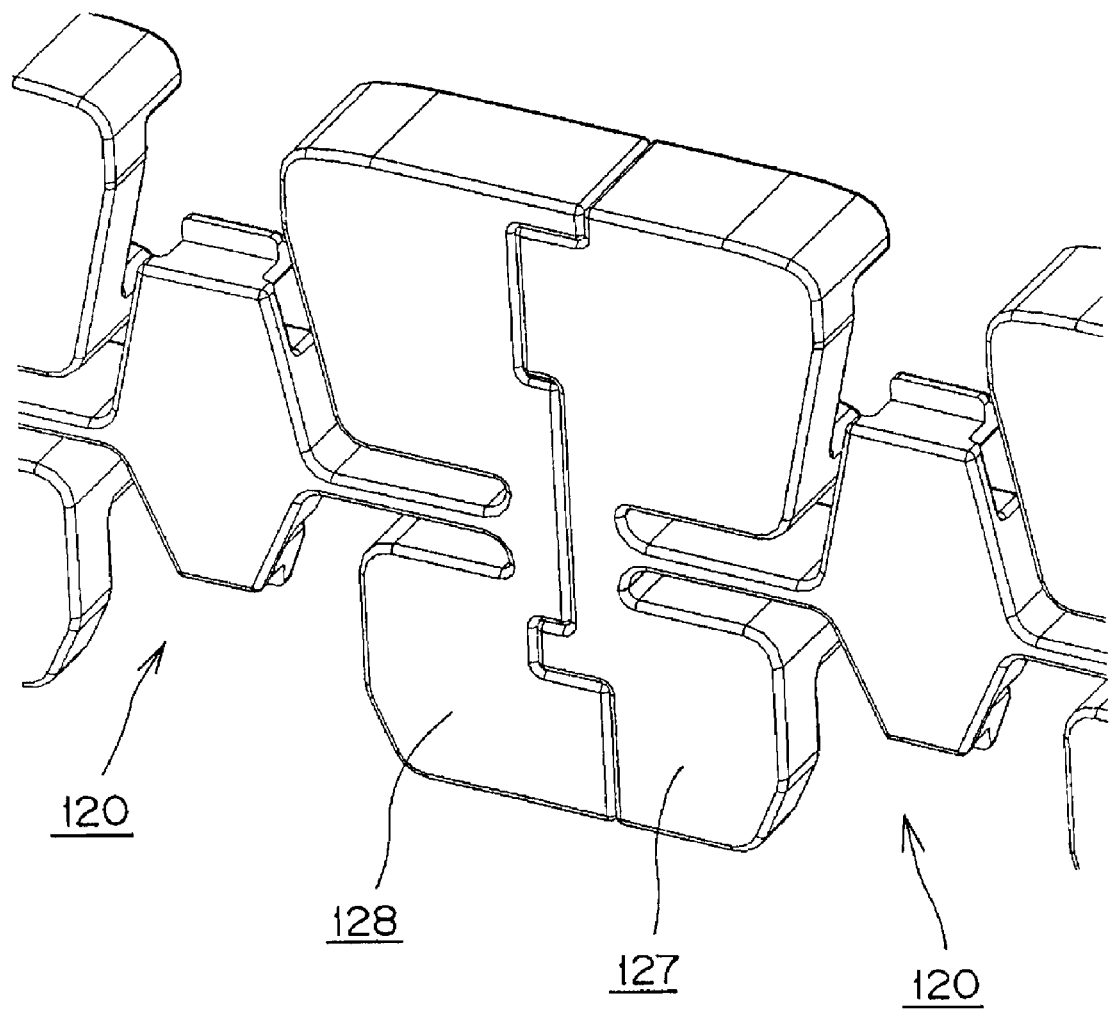
FIG. 15 is a view when the male connecting plate and the female connecting plate are connected by a rotation type snap-fit mechanism (at the time of completion of connection).

The male connecting plate 127 and the female connecting plate 128 are connected to each other by a rotation type snap-fit mechanism as shown in FIGS. 12 to 15. First, as shown in FIG. 12, two link modules 120 are caused to get closer to each other in a direction substantially perpendicular to each other and the male connecting plate 127 and the female connecting plate 128 are opposed to each other. As shown in FIG. 13, the convex portion of the male connecting plate 127 and the concave portion of the female connecting plate 128 are fitted to each other. Further, as shown in FIG. 14, both connecting plates 127 and 128 are rotated in opposite directions to each other using the fitted portion of the convex portion and concave portion as the center so that a surface of the male connecting plate 127 and a surface of the female connecting plate 128 become a flat surface. At this time, the upper engagement pawl portion 127b of the male connecting plate 127 and the upper engagement pawl portion 128b of the female connecting plate 128 engage with each other. At the same time the lower engagement pawl portion 127c of the male connecting plate 127 and the lower engagement pawl portion 128c of the female connecting plate 128 engage with each other. As shown in FIG. 15, the connection between the male connecting plate 127 and the female connecting plate 128 is completed and the obtained outer shape composed of the male connecting plate 127 and the female connecting plate 128 has the same outer shape as that of the side plate 122.

It is noted that the connection between the male connecting plate 127 or the link module 120 and the female connecting plate 128 of a bracket joint and the connection between the female connecting plate 128 of the link module 120 and the male connecting plate 127 of a bracket joint are performed in the same manner as in the connection between the above-mentioned link modules.

When such a rotation type snap-fit mechanism is used in the connection between the link modules 120 and the connection between the link module 120 and a bracket joint, since a connecting portion itself has connection force, the connection between the link modules 120 or the connection between the link module 120 and a bracket joint is previously performed and after that stopper links can be incorporated. An assembly operation load is remarkably reduced and at the same time batch treatment of an assembly operation becomes possible. After the assembly the link module and the bracket joint can be easily exchanged with another link module and bracket joint having different numbers of side plates. Therefore, the entire length of the cable protection and guide device can be easily changed so that operability is improved.

The connection between the link modules and the connection between the link module and the bracket joint are performed by a rotating direction having no relationship to an operation direction of the cable protection and guide device. After the connection, force applied in an operation direction is received by pawl portions, provided on an upper convex portion and a lower concave portion, forming a rotation type snap-fit mechanism. As the components are engaged with each other, strength and endurance are improved.

It is noted that although in the above-mentioned example a link module 120 composed of side plates 122 whose number is three, has been explained, the number of the side plates forming a link module is not only limited to 3 but also even cases of four and two or less may be adopted. Further, even zero, "0", side plates may be adopted. The number of the side plates/couplings can control fine (precise) adjustment of the whole length of the cable protection and guide device.

FIG. 16 is a perspective view obtained when a link module 220 of side plates whose number is "0" is viewed from the outside. That is both ends of flexible coupling arms 226 extended from a coupling portion 224 respectively have a male connecting plate 227 and a female connecting plate 228, which are respectively connected to adjacent link modules. FIG. 17 is a perspective view from the inside of the link module 220 shown in FIG. 16, that is, from a cable accommodating space side. It is noted that the link module 220 of the side plates whose number is "0", shown in FIGS. 16 and 17, is the same as in the above-mentioned link module 120 insofar as the shapes of the male connecting plate, the female connecting plate, the coupling portion, and the functions thereof are concerned. Thus the detailed explanations of the corresponding portions are omitted by denoting reference numerals of 200s in place of the reference numerals of 100s.

According to the cable protection and guide device of the present invention, the whole length can be finely (precisely) set without increasing the number of parts, and at the same time a mounting bracket can be connected by a snap-fit mechanism in the same manner as the stopper link. Thus the effects of the present invention are very large.

DESCRIPTION OF REFERENCE NUMERALS

100 . . . Cable protection and guide device
110 . . . Side plate
120, 220 . . . Link module
122 . . . Side plate
122a . . . Upper engagement region (of side plate)
122b . . . Lower engagement region (of side plate)
122c . . . Lower side surface (of side plate)
124, 224 . . . Coupling portion
124a . . . Upper end convex portion (of coupling portion)
124b . . . Lower end convex portion (of coupling portion)
124c . . . Arc-shaped convex portion (of coupling portion)
124d . . . Cylindrical columnar convex portion (of coupling portion)
126, 226 . . . Coupling arm
127, 227 . . . Male connecting plate
127a, 227a . . . Convex portion (of male connecting portion)
127b, 227b . . . Upper engagement pawl portion (of male connecting portion)
127c, 227c . . . Lower engagement pawl portion (of male connecting portion)
128, 228 . . . Female connecting plate
128a, 228a . . . Concave portion (of female connecting portion)
128b, 228b . . . Upper engagement pawl portion (of female connecting portion)
128c, 228c . . . Lower engagement pawl portion (of female connecting portion)
130 . . . Stopper link
131 . . . Upper concave portion (of stopper link)
132 . . . Lower concave portion (of stopper link)
133 . . . Coupling portion upper supporting portion (of stopper link)
134 . . . Coupling portion lower supporting portion (of stopper link)
135 . . . Engagement concave portion (of stopper link)
136 . . . Circular recess portion (of stopper link)
137 . . . Upper side convex portion (of stopper link)
138 . . . Lower side convex portion (of stopper link)
139 . . . Arc-shaped portion (of stopper link)
142 . . . Fixed connecting arm
144 . . . Opening/closing connecting arm
150A, 150B . . . Mounting bracket
151A . . . Mounted portion (of mounting bracket)
152A . . . Through hole (of mounting bracket)
151 . . . Upper concave portion (of mounting bracket)
152 . . . Lower concave portion (of mounting bracket)
153 . . . Coupling portion upper supporting portion (of mounting bracket)
154 . . . Coupling portion lower supporting portion (of mounting bracket)
155 . . . Engagement concave portion (of mounting bracket)
156 . . . Circular recess portion (of mounting bracket)
157 . . . Upper side convex portion (of mounting bracket)
158 . . . Lower side convex portion (of mounting bracket)
159 . . . Arc-shaped portion (of mounting bracket)
161, 162, 163 . . . Bracket joint
500 . . . Cable protection and guide device
510 . . . Side plate portion
520 . . . Link module
522 . . . Side plate
524 . . . Coupling portion
526 . . . Coupling arm
527 . . . Male connecting plate
528 . . . Female connecting plate
530 . . . Stopper link
540 . . . Connecting arm Those skilled in the art will readily recognize that the invention has been set forth by way of example only and that changes may be made thereto without departing from the spirit and scope of the claimed invention.

The invention claimed is:

1. A cable protection and guide device, comprising:
a left side link module and a right side link module;
each of said link modules includes a number of spaced right and left side plates and coupling portions between said right side plate and coupling portions between said left side plate;
said spaced right and left side plates are connected to each other;

said number of pairs of right and left spaced side plates are articulately connected to each other in a longitudinal direction from a mounting fixed end to a mounting movable end enabling said side plates to form a flexional circumferential bend having a flexional inner circumferential side and flexional outer circumferential side;

each of said side plates includes a flexional inner circumferential side residing during bending on said flexional inner circumferential side of said bend;

each of said side plates includes an outer circumferential side residing during bending on said outer flexional circumferential side of said bend, connecting arms, said connecting arms are respectively bridged over a flexional inner circumferential side and a flexional outer circumferential side of said side plates at required intervals;

a cable is accommodated in a cable accommodating space surrounded by said side plates and said connecting arms from said mounting fixed end toward said mounting movable end;

said link modules include integrally molded side plates, said side plates are integrally formed with flexible couplings joining said side plates, said flexible coupling include arms extending from said coupling portions, stopper links;

fixed connecting arms;

said stopper links interconnected by said fixed connecting arms;

said stopper links snap fit into said coupling portions of said link modules from a cable accommodating space side;

said coupling portions joining said stopper links and said connecting arms;

said link modules include a male connecting plate and a female connecting plate interconnecting said link modules together;

said male connecting plate and said female connecting plate are each formed in the same outer shape as that of said side plate when connected together;

bracket joints; each of said bracket joints formed from a link module; each of said bracket joints includes a coupling portion and a male or female connecting plate; said bracket joints cut to a desired length from a link module so as to precisely determine the length of said cable protection and guide device;

mounting brackets positioned at said mounting fixed end and said mounting movable end;

said mounting brackets include a snap-fit mechanism;

said mounting brackets each engaging a respective end coupling portion of said bracket joints; and, said end coupling portion includes a snap-fit portion which interengages said snap-fit portion of said mounting bracket.

2. A cable protection and guide device, comprising:

at least a pair of link modules (first and second modules) in combination with pairs of stopper links, said pairs of stopper links interconnected with fixed connecting arms;

said link modules include a number of integrally molded side plates and coupling portions joining said side plates together; said link modules further include mating ends;

each of said coupling portions include a snap-fit mechanism;

each of said coupling portions include integrally molded arms interengaging said side plates;

each of said link modules, each of said plates, each of said couplings and each of said coupling arms being a resinous material capable;

bracket joints comprising a link module having coupling arms cut to a specified length, said bracket joint having a mating end and a coupling on the other end thereof;

mounting brackets affixed to a machine, each of said mounting brackets includes a snap-fit mechanism; and, said couplings adjacent said cut arms of said bracket joints interengage said snap-fit mechanisms of said mounting bracket; and, said mating ends of said first and second link modules interengaging said mating ends of said bracket joints.

* * * * *